(12) United States Patent
Rocher et al.

(10) Patent No.: US 12,202,462 B2
(45) Date of Patent: Jan. 21, 2025

(54) DEVICE FOR AUTOMATICALLY DETECTING COUPLING BETWEEN ELECTRONIC DEVICES

(71) Applicant: Vitesco Technologies GmbH, Regensburg (DE)

(72) Inventors: Jacques Rocher, Toulouse (FR); Yannick Leroy, Toulouse (FR)

(73) Assignee: VITESCO TECHNOLOGIES GBMH, Regensburg (DE)

( * ) Notice: Subject to any disclaimer, the term of this patent is extended or adjusted under 35 U.S.C. 154(b) by 156 days.

(21) Appl. No.: 18/013,037

(22) PCT Filed: Jun. 24, 2021

(86) PCT No.: PCT/EP2021/067340
§ 371 (c)(1),
(2) Date: Dec. 27, 2022

(87) PCT Pub. No.: WO2022/017719
PCT Pub. Date: Jan. 27, 2022

(65) Prior Publication Data
US 2023/0242087 A1 Aug. 3, 2023

(30) Foreign Application Priority Data

Jul. 21, 2020 (FR) ...................................... 2007636

(51) Int. Cl.
*B60W 10/06* (2006.01)
*G05B 19/042* (2006.01)
*H02J 50/10* (2016.01)

(52) U.S. Cl.
CPC ......... *B60W 10/06* (2013.01); *G05B 19/0425* (2013.01)

(58) Field of Classification Search
CPC ......... H02J 50/10; H02J 7/0047; H02J 7/0068
See application file for complete search history.

(56) References Cited

U.S. PATENT DOCUMENTS

| | | | |
|---|---|---|---|
| 2009/0187306 A1 | 7/2009 | Grimes et al. | |
| 2011/0216452 A1* | 9/2011 | Haines | H02H 3/16 361/42 |
| 2012/0139615 A1 | 6/2012 | Zimmermann | |
| 2013/0119952 A1* | 5/2013 | Weng | G06F 1/305 323/265 |

(Continued)

FOREIGN PATENT DOCUMENTS

| | | |
|---|---|---|
| EP | 2101159 A2 | 9/2009 |
| FR | 3090925 A1 | 6/2020 |

OTHER PUBLICATIONS

International Search Report and Written Opinion for International Application No. PCT/EP2021/067340, dated Oct. 8, 2021, 8 pages.

(Continued)

*Primary Examiner* — Jermele M Hollington
*Assistant Examiner* — Temilade S Rhodes-Vivour
(74) *Attorney, Agent, or Firm* — Buchanan Ingersoll & Rooney PC

(57) ABSTRACT

A method for automatically detecting a sensor coupled to an electronic computer including steps of detecting the sensor and steps of configuring a hardware interface.

5 Claims, 3 Drawing Sheets

(56) References Cited

U.S. PATENT DOCUMENTS

| | | | |
|---|---|---|---|
| 2014/0223037 A1* | 8/2014 | Minoo | G06F 11/3051 |
| | | | 710/16 |
| 2016/0252891 A1 | 9/2016 | Hutt et al. | |
| 2019/0131823 A1* | 5/2019 | Ahn | H01F 27/2823 |
| 2019/0159326 A1* | 5/2019 | Proell | H05G 1/14 |
| 2019/0173439 A1* | 6/2019 | Dunworth | H03F 1/0261 |

OTHER PUBLICATIONS

International Search Report and Written Opinion for International Application No. PCT/EP2021/067340, dated Oct. 8, 2021 (French), 12 pages.

\* cited by examiner

DEVICE FOR AUTOMATICALLY DETECTING COUPLING BETWEEN ELECTRONIC DEVICES

CROSS REFERENCE TO RELATED APPLICATIONS

This application is the U.S. National Phase Application of PCT International Application No. PCT/EP2021/067340, filed Jun. 24, 2021, which claims priority to French Patent Application No. 2007636, filed Jul. 21, 2020, the contents of such applications being incorporated by reference herein.

FIELD OF THE INVENTION

The present invention relates generally to the coupling of electronic devices. The invention finds applications, in particular, in the automotive field. It may be implemented, for example, in an electronic computer.

BACKGROUND OF THE INVENTION

A motor vehicle nowadays comprises more and more onboard electronics such as, for example, sensors coupled to electronic computers. These onboard electronics require connection technology of greater or lesser complexity in the motor vehicle.

In the case of an internal combustion engine, sensors are used and coupled to at least one electronic computer such as an engine control computer in order to ensure correct operation of said internal combustion engine and thus allow better control of fuel consumption and therefore control of the emission of pollutants into the atmosphere.

To produce these sensors, it is known practice in the prior art to use a voltage-source sensor positioned facing a movable notched target. Said sensor generally has three sensor pins for transferring a detection signal in the form of a variation in voltage to the engine control computer.

For a few years, a new sensor technology has been developed: current-source sensors. These sensors deliver information in the form of a variation in current.

Depending on the type of sensor used, the engine control computer has a different dedicated hardware interface allowing the coupling of said sensor to said engine control computer. This interface makes it possible, among other things, with suitable electronics (in the electronic computer) to generate and receive electrical signals appropriate for managing, in this case, the internal combustion engine.

Thus, it is necessary, when designing the engine control computer, to modify its hardware interface depending on the type of sensor connected, that is to say a voltage-source sensor or a current-source sensor. Consequently, it is no longer possible, once the choice of sensor has been made, to change the type of sensor, for example over the lifespan of the vehicle, because the hardware interface is not adaptive.

SUMMARY OF THE INVENTION

An aspect of the invention proposes a computer comprising a hardware interface that can be adapted according to the type of coupled sensor, and a selection method allowing connection of one of the two types of sensors without hardware modifications.

To this end, an aspect of the invention proposes a method for automatically detecting a sensor coupled to an electronic computer, comprising:

a first step e1) consisting of waiting for the electronic computer to be switched on, a second step e2) consisting of selecting a determined impedance between the first computer pin (4_1) and the second computer pin (4_2), a third step e3) consisting of software configuration of a hardware interface in order to allow the signals delivered by the voltage-source sensor to be read, a fourth step e4), consisting of comparing a reference value and a value generated by the voltage-source sensor, and moving on to a fifth step e5) if the result of the comparison is positive and moving on to a sixth step e6) if the result of the comparison is negative, a fifth step e5), consisting of software configuration of the electronic computer corresponding to a coupling with a voltage-source sensor, a sixth step e6), consisting of software configuration of the electronic computer corresponding to a coupling with a current-source sensor.

Advantageously, it is now possible to couple either of the two types of sensor(s) to the electronic computer.

For example, the reference value is 4.5 V.

Advantageously, the automatic detection method according to an aspect of the invention provides for the software configuration in the fifth step e5) to consist of retrieving predetermined values corresponding to a voltage-source sensor from a memory of the electronic computer, allowing (re)configuration each time the internal combustion engine is started.

Advantageously, the automatic detection method according to an aspect of the an aspect of also envisages the software configuration in the sixth step e6) consisting of retrieving predetermined values corresponding to a current-source sensor from a memory of the electronic computer, allowing a change of sensor.

BRIEF DESCRIPTION OF THE DRAWINGS

One preferred exemplary embodiment of the invention will now be described with reference to the appended drawings, in which.

DETAILED DESCRIPTION OF THE PREFERRED EMBODIMENTS

Figure 1:
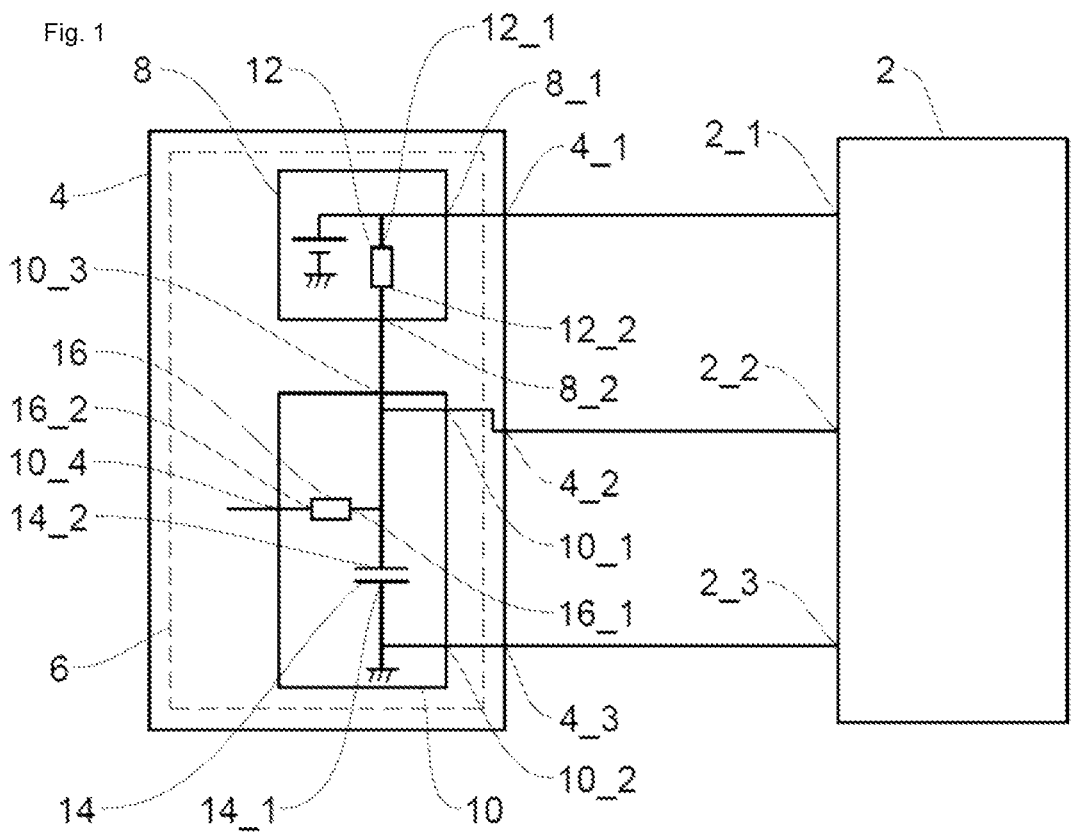
FIG. 1 shows a schematic view of a computer of the prior art coupled to a voltage-source sensor.

FIG. 1 illustrates a voltage-source sensor 2 of the prior art coupled, for example, to an engine control computer 4. The voltage-source sensor 2 is, for example, a sensor dedicated to detecting the positioning of a camshaft of an internal combustion engine through the movement of teeth of said target in front of said voltage-source sensor 2. Such a voltage-source sensor 2 generally comprises three pins with a first sensor pin 2_1 coupled, for example, to a first computer pin 4_1 and suitable for supplying said voltage-source sensor 2 with electrical power; a second sensor pin 2_2 coupled to a second computer pin 4_2 dedicated to receiving a signal which is representative of the position of the camshaft; and finally a third sensor pin 2_3 coupled to a third computer pin 4_3 which is generally coupled to an electrical ground of the motor vehicle. The internal structure of the voltage-source sensor 2 is well known to those skilled in the art; it will not be presented in detail here.

The engine control computer 4 has a hardware interface 6 comprising, for example, a sensor power-supply module 8 and a signal processing module 10.

The sensor power-supply module 8 is suitable for supplying electrical power to the voltage-source sensor 2. For this purpose, it has a first sensor power-supply module pin 8_1 suitable for generating said electrical power supply for said voltage-source sensor 2 through the first computer pin 4_1. For example, the electrical power supply has a value of 5 V. The internal structure of the sensor power-supply module 8 is well known to a person skilled in the art and numerous variants are available to them.

In one exemplary embodiment, the sensor power-supply module 8 comprises an electrical power supply which may be a power supply which is internal to the engine control computer 4 and a so-called "pull-up" resistor 12. Said pull-up resistor 12 has the role of biasing the voltage-source sensor 2. The pull-up resistor 12 has a first resistor pin 12_1 coupled firstly to the electric power supply and secondly to the first sensor power-supply module pin 8_1. It further comprises a second resistor pin 12_2 coupled to a second electric-power-supply module pin 8_2.

The signal processing module 10 is suitable for shaping and/or filtering a signal originating from the voltage-source sensor 2. For this purpose, the signal processing module 10 comprises a first signal processing module pin 10_1, a second signal processing module pin 10_2 and a third signal processing module pin 10_3.

For example, the first signal processing module pin 10_1 is coupled to the second computer pin 4_2 and also to the third signal processing module pin 10_3. The second signal processing module pin 10_2 is coupled to the third computer pin 4_3 and the third signal processing module pin 10_3 is coupled to the second electric-power-supply module pin 8_2. A fourth signal processing module pin 10_4 is suitable for generating a filtered signal for at least one other function of the engine control computer 4.

Furthermore, the internal structure of the signal processing module 10 may comprise a first capacitor 14 having a first first-capacitor pin 14_1 and a second first-capacitor pin 14_2. The second first-capacitor pin 14_2 is coupled to electrical ground and the first first-capacitor pin 14_1 is coupled firstly to a first resistor pin 16_1 and secondly to the third signal processing module pin 10_3. Furthermore, the third pin 10_3 is coupled to the first pin 10_1. The signal processing module 10 further has a resistor 16 having a second resistor pin 16_2. The second resistor pin 16_2 is coupled to the fourth signal processing module pin 10_4. The values of the various elements, such as the resistors and the capacitor, are well known to a person skilled in the art and are consequently not given here.

Figure 2:
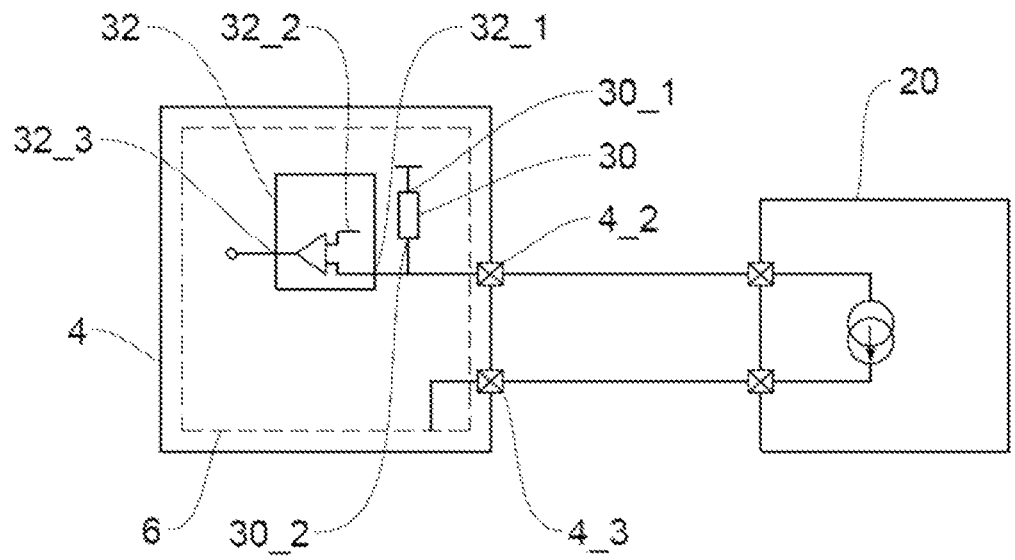
FIG. 2 shows a schematic view of a computer of the prior art coupled to a current-source sensor.

FIG. 2 shows an example of a current-source sensor 20 of the prior art. This current-source sensor 20 operates and is coupled to the engine control computer 4. The current-source sensor 20 delivers information in the form of a current variation requiring a different hardware interface 6 for the engine control computer 4 in order to be able to detect close current levels originating from the current-source sensor 20.

For this purpose, a resistor 30 known by a person skilled in the art as a shunt resistor may be used, comprising a first resistor pin 30_1 and a second resistor pin 30_2. The first resistor pin 30_1 is coupled to the electrical power supply of said engine control computer 4, the second resistor pin 30_2 is coupled firstly to the second computer pin 4_2 and secondly to a first conversion device pin 32_1. The conversion device 32 is suitable for comparing and matching the voltage applied to the second resistor pin 30_2 and the reference voltage applied to the second conversion device pin 32_2.

The conversion device 32 is, in one exemplary embodiment, a comparator assembly produced using an operational amplifier. The conversion device 32 further has a second conversion device pin 32_2 coupled to a reference voltage. The value of the reference voltage may, for example, be 4.5 V. Furthermore, the conversion device 32 has a third conversion device pin 32_3 coupled to internal functions of the engine control computer 4. The latter is therefore suitable for generating an electrical signal in the form of at least two voltage levels which are representative of the current flowing through the shunt resistor 30. Preferably, the shunt resistor 30 has a relatively low value of the order, for example, of 10 ohms.

As mentioned above in the text of the description, for each type of sensor 2, 20, it is therefore necessary, upstream, to modify the internal structure of the hardware interface 6.

Figure 3:
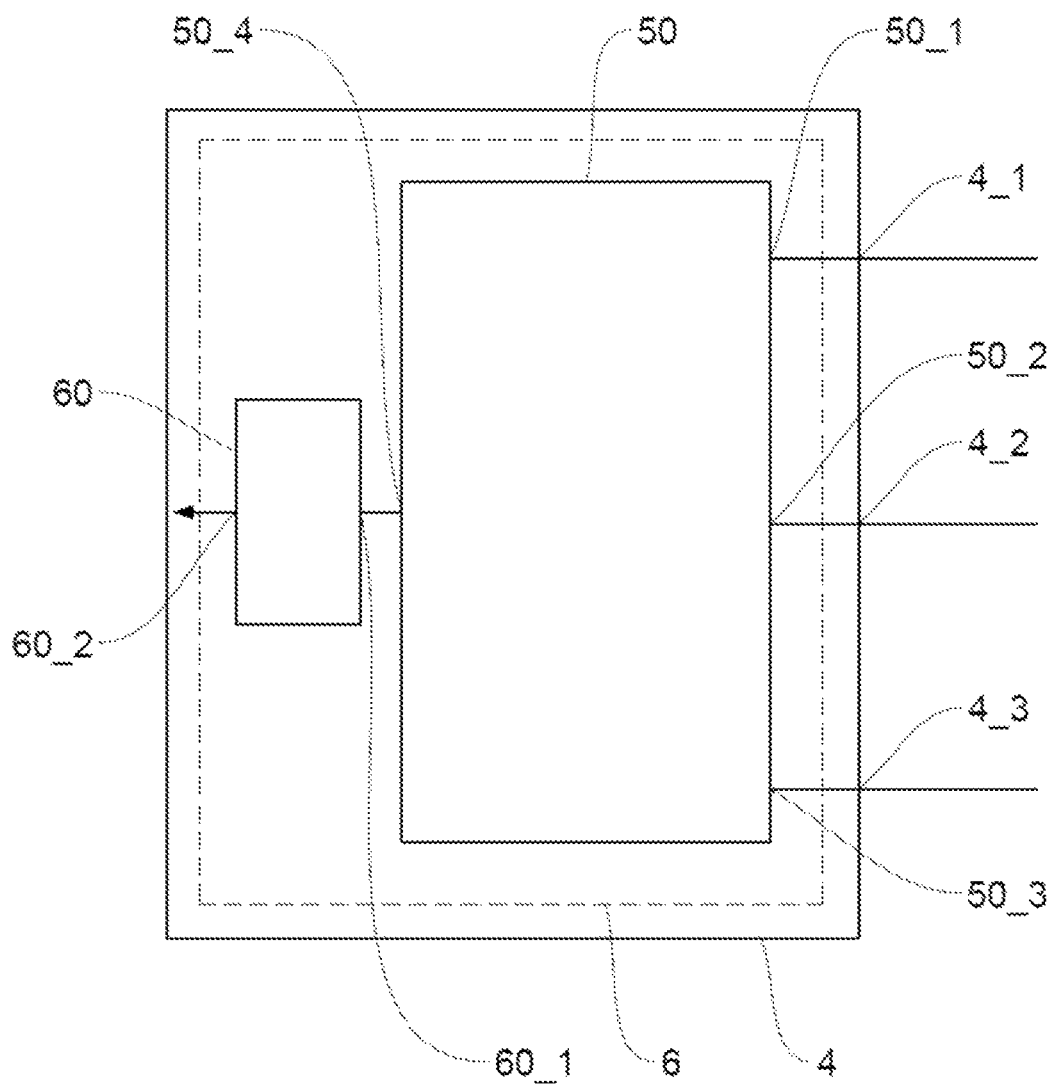
FIG. 3 shows a schematic view of a computer comprising a hardware interface according to an aspect of the invention.

An aspect of the invention proposes, as illustrated in FIG. 3, a novel hardware interface 6 allowing either a voltage-source sensor or a current-source sensor to be coupled without modifying the internal structure of the hardware interface 6 upstream.

To do this, ingeniously, a hardware interface 6 is proposed comprising an adaptation module 50 and a processing module 60. Thanks to this new hardware interface 6, it is now possible to connect either a voltage-source sensor or a voltage-source sensor to the engine control computer 4 without modifying the internal interface of said engine control computer 4.

The adaptation module 50 has, in one embodiment of the invention, a first adaptation module pin 50_1, a second adaptation module pin 50_2 and a third adaptation module pin 50_3, which are coupled to the first computer pin 4_1, to the second computer pin 4_2 and to the third computer pin 4_3, respectively. The adaptation module 50 also has at least one fourth adaptation module pin 50_4.

The first sensor detection module pin 50_1, the second sensor detection module pin 50_2 and the third sensor detection module pin 50_3 are adapted to receive signals from a sensor 2, 20 coupled to said pins. As a variant, at least one of these three pins is suitable for supplying electrical energy to the sensor 2, 20.

As mentioned above in the text of the description, in the case of a voltage-source sensor 2, the signal generated by said sensor 2 coupled to said pins of said engine control computer 4 is typically of the order of 5 V at rest, that is to say with the engine off.

In addition, as mentioned above in the text of the description, in the case of a current-source sensor 20, the signal generated by said sensor 20 coupled to said pins of said engine control computer 4 is typically of the order of 4.5 V at rest, that is to say with the engine off.

Ingeniously, the adaptation module 50 is suitable for firstly detecting the type of sensor 2, 20 coupled to the engine control computer 4 and secondly adapting the impedance for these input pins in order to allow both correct operation of the sensor 2, 20 and also reading of the information delivered by the latter.

Thus, for example, in one embodiment of the invention, when the sensor 2, 20 coupled to the engine control computer 4 is a voltage-source sensor, the adaptation module 50 selects between the pins of said computer 4 (which are coupled to the sensor 2) a resistor with a high impedance of the order of 1000 ohms. The equivalent electronic circuit in this embodiment is then the circuit shown in FIG. 1. The operation of the adaptation module 50 in this embodiment is also similar to that of the electronic circuit of FIG. 1 presented earlier.

If the sensor 20 is a current-source sensor then the adaptation module 50 selects between the pins of said computer 4 (which are coupled to the sensor 20) a resistor with a relatively low impedance of the order of 10 ohms. For example, the equivalent electronic circuit in this embodiment is the circuit shown in FIG. 2; the operation is also identical to that in FIG. 2.

Figure 4:
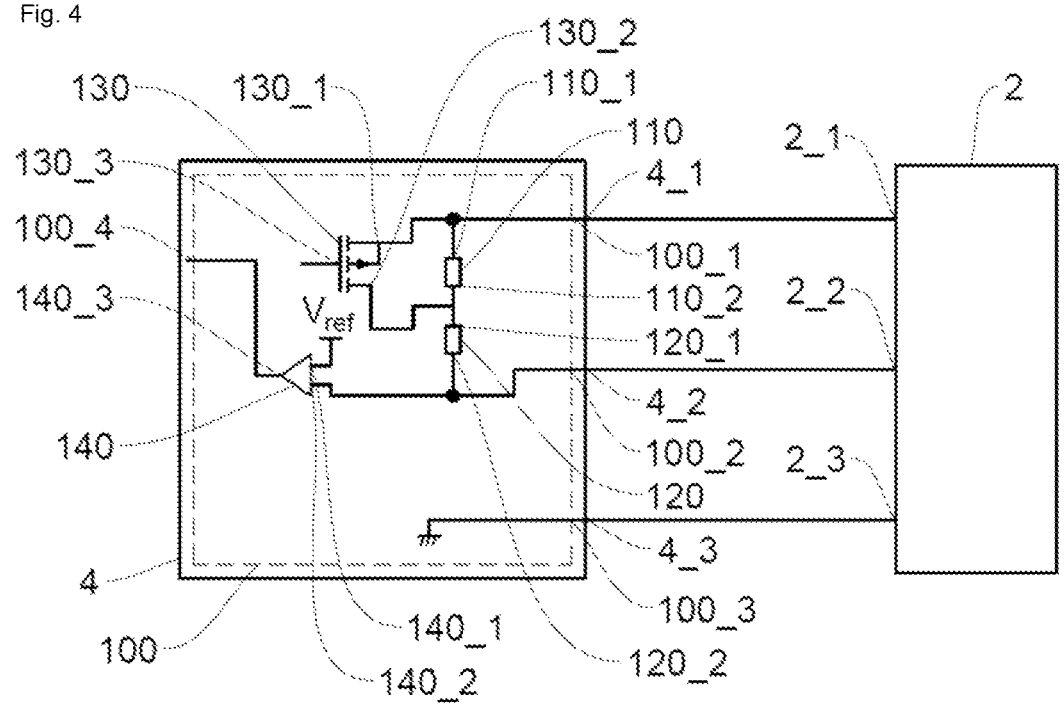
FIG. 4 presents an exemplary embodiment of the invention.

FIG. 4 presents an exemplary embodiment of the adaptation module 50 and of the processing module 60, which are brought together in a hardware interface 100 allowing either a voltage-source sensor 2 or a current-source sensor 20 to be coupled without modifying the internal structure of the hardware interface 100 upstream.

For this purpose, ingeniously, what is proposed is a hardware interface 100 which is suitable for connecting either a voltage-source sensor 2 or a current-source sensor 20 to the engine control computer 4 without any need to modify the hardware interface 100 of said engine control computer 4. Thus, advantageously, the hardware interface 100 is compatible with the two types of sensors 2, 20.

The hardware interface 100 comprises, in one preferred embodiment, a first hardware interface input 100_1, a second hardware interface input 100_2 and a third hardware interface input 100_3, which are coupled to the first computer pin 4_1, to the second computer pin 4_2 and to the third computer pin 4_3, respectively. The hardware interface 100 further comprises a first hardware interface output 100_4 coupled to devices which are internal and/or external to the engine control computer 4.

The hardware interface 100 comprises a first resistor 110, a second resistor 120, a transistor 130, and a comparator 140.

The first resistor 110 comprises a first first-resistor pin 110_1 and a second first-resistor pin 110_2. The second resistor 120 comprises a first second-resistor pin 120_1 and a second second-resistor pin 120_2. The first first-resistor pin 110_1 is coupled firstly to the first hardware interface pin 100_1 and secondly to a first transistor pin 130_1. The second first-resistor pin 110_2 is coupled firstly to the first second-resistor pin 120_1 and secondly to a second transistor pin 130_2. Furthermore, the transistor 130 comprises a third transistor pin 130_3 corresponding, in the case of an MOS (metal oxide semiconductor) transistor 130, to the gate, as is known by a person skilled in the art.

The second second-resistor pin 120_2 is coupled firstly to the second hardware interface pin 100_2 and secondly to a second comparator input 140_2. The comparator 140 further comprises a first input 140_1 coupled to a reference voltage which may have, in one exemplary embodiment, a value of 4.5 V. The first comparator output 140_3 is coupled to the first hardware interface output 100_4. The third hardware interface input 100_3 is coupled to a ground of the motor vehicle.

Advantageously, by virtue of the hardware interface 100 according to an aspect of the invention and, more precisely, by virtue of the combination of the coupling of the first resistor 110, of the second resistor 120 and of the transistor 130, it is possible to select a low impedance value corresponding to the value of the second resistor 120 or a high impedance value corresponding to the value of the first resistor 110 added to the value of the second resistor 120 between the first hardware interface pin 100_1 and the second hardware interface pin 100_2. What is understood by low impedance value is a value of the order of ten ohms and by high impedance value a value of the order of a thousand ohms. Thus, advantageously, the selection of the impedance value allows either a voltage-source sensor 2 or a current-source sensor 2 to be connected to the terminals of the computer 4 without modifying the hardware interface 100.

As mentioned above in the text of the description, either a voltage-source sensor 2 or a current-source sensor 20 may thus be coupled to the first computer pin 4_1, to the second computer pin 4_2 and to the third computer pin 4_3.

An aspect of the invention therefore proposes a method making it possible to automatically detect the type of sensor 2, 20 and furthermore to configure the computer 4 according to the type of sensor 2, 20 coupled.

Figure 5:
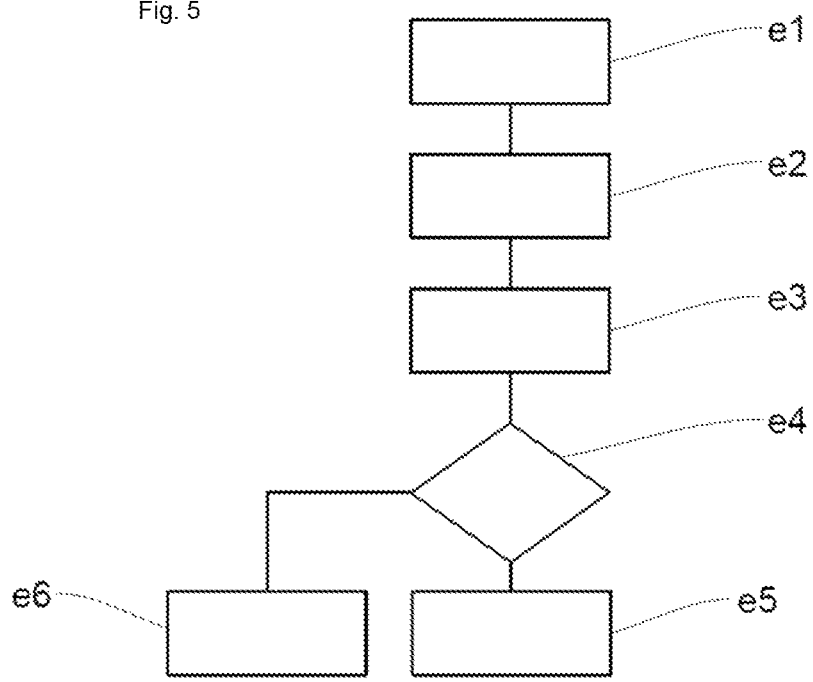
FIG. 5 presents an algorigram of the detection method according to an aspect of the invention.

To do this, as illustrated in FIG. 5, a first step e1) is first carried out consisting of waiting for the computer 4 to be switched on, that is to say powered up.

Once the computer 4 has been powered up, a second step e2) is performed consisting of selecting an impedance between the first computer pin 4_1 and the second computer pin 4_2 corresponding/compatible to/with that of a voltage-source sensor 2. To do this, the method of an aspect of the invention provides for the transistor 130 to be controlled in open circuit mode, that is to say that the first resistor 110 is no longer short-circuited by the transistor 130 in order to apply between the first computer pin 4_1 and the second computer pin 4_2 an impedance compatible with a voltage-source sensor 2 coupled to said pins.

According to the method of an aspect of the invention, during a third step e3, software configuration of the hardware interface 100 is performed in order to allow the signals delivered by the voltage-source sensor 2 to be read.

During a fourth step e4, the method performs an analysis of the signal from the sensor 2 coupled to the pins 4_1 and 4_2. If the measured value is greater than a threshold value Vref then the method moves to a fifth step e5 and if the measured value is less than Vref the method provides for movement on to a sixth step e6. This comparison is for example carried out by the comparator 140.

The fifth step e5, according to the method of an aspect of the invention, corresponds to the presence of the voltage-source sensor 2 coupled between the first computer pin 4_1 and the second computer pin 4_2. Thus, the computer may for example restore parameters in memory corresponding to the parameters of a voltage-source sensor 2 in order to calibrate and measure the signals from said voltage-source sensor 2 once the internal combustion engine is in operation.

The sixth step e6, according to the method of an aspect of the invention, corresponds to the presence of a current-source sensor 20 coupled between the first computer pin 4_1 and the second computer pin 4_2. Thus, the computer may for example restore parameters in memory corresponding to the parameters of a current-source sensor 20 in order to calibrate and measure the signals from said current-source sensor 20 once the internal combustion engine is in operation.

Advantageously, thanks to an aspect of the invention, the detection of the type of sensor 2, 20 is carried out instantaneously before, for example, the internal combustion engine is started. Furthermore, thanks to an aspect of the invention, it is possible to change the sensor 2, 20 and also to change the type of sensor without performing software calibration.

Thus, thanks to an aspect of the invention, it is now possible to couple either a voltage-source or current-source sensor to an engine control computer without prior calibration. In addition, ingeniously, no software calibration is necessary.

In one variant embodiment, a recording module (not shown in the figures) is also used in the hardware interface, making it possible, after detection of the type of sensor, to record the type of sensor connected to said engine control computer. Thus, the type of sensor coupled to said engine control computer is ingeniously reset each time the engine is started.

In another variant, the hardware interface includes a module for detecting teeth on the signal delivered by the sensor.

The invention claimed is:

1. A method for automatically detecting a sensor coupled to an electronic computer, the sensor comprising a supply connection and a signal connection, the method comprising:
   a first step e1) consisting of waiting for the electronic computer to be switched on;
   a second step e2) consisting of selecting a determined impedance between a first computer pin coupled to the supply connection of the sensor and a second computer pin coupled to the signal connection of the sensor;
   a third step e3) consisting of software configuration of a hardware interface in order to allow signals delivered by a voltage-source sensor to be read;
   a fourth step e4), consisting of comparing a reference value and a value generated by the voltage-source sensor, and moving on to a fifth step e5) if the result of the comparison is positive and moving on to a sixth step e6) if the result of the comparison is negative;
   the fifth step e5), consisting of software configuration of the electronic computer corresponding to a coupling with a voltage-source sensor which provides a first impedance between the supply connection of the sensor and the signal connection of the sensor; and
   the sixth step e6), consisting of software configuration of the electronic computer corresponding to a coupling with a current-source sensor which provides a second impedance between the supply connection of the sensor and the signal connection of the sensor.

2. The method for automatically detecting a sensor coupled to an electronic computer as claimed in claim 1, wherein the reference value is 4.8 V.

3. The method for automatically detecting a sensor coupled to an electronic computer as claimed in claim 1, wherein the software configuration in the fifth step e5) consists of retrieving predetermined values corresponding to a voltage-source sensor from a memory of the electronic computer.

4. The method for automatically detecting a sensor coupled to an electronic computer as claimed in claim 1, wherein the software configuration in the sixth step e6) consists of retrieving predetermined values corresponding to a current-source sensor from a memory of the electronic computer.

5. The method for automatically detecting a sensor coupled to an electronic computer as claimed in claim 1, wherein the first impedance is greater than the second impedance.

* * * * *

UNITED STATES PATENT AND TRADEMARK OFFICE
CERTIFICATE OF CORRECTION

| | | |
|---|---|---|
| PATENT NO. | : 12,202,462 B2 | Page 1 of 1 |
| APPLICATION NO. | : 18/013037 | |
| DATED | : January 21, 2025 | |
| INVENTOR(S) | : Jacques Rocher and Yannick Leroy | |

It is certified that error appears in the above-identified patent and that said Letters Patent is hereby corrected as shown below:

On the Title Page

Item (73) Assignees: Change "VITESCO TECHNOLOGIES GBMH" to -- VITESCO TECHNOLOGIES GMBH --.

Signed and Sealed this
Twenty-fifth Day of February, 2025

Coke Morgan Stewart
*Acting Director of the United States Patent and Trademark Office*